United States Patent [19]

Kempter et al.

[11] Patent Number: 4,868,227

[45] Date of Patent: Sep. 19, 1989

[54] MINERAL AND TEXTILE WEBS BONDED WITH A CURED RESIN MIXTURE

[75] Inventors: Fritz E. Kempter, Mannheim; Franz Matejcek, Lambsheim; Werner Neubach, Ludwigshafen; Gerd Busse, Mutterstadt, all of Fed. Rep. of Germany

[73] Assignee: BASF Aktiengesellschaft, Ludwigshafen, Fed. Rep. of Germany

[21] Appl. No.: 158,626

[22] Filed: Feb. 22, 1988

[30] Foreign Application Priority Data

Mar. 11, 1987 [DE] Fed. Rep. of Germany ....... 3707691

[51] Int. Cl.$^4$ ................................................ C08K 7/00
[52] U.S. Cl. .................................... 523/222; 524/541; 524/542; 524/515; 524/516; 525/493; 525/494; 525/515; 525/516
[58] Field of Search ............... 524/542, 515, 516, 541; 523/222; 525/515, 516, 493, 494

[56] References Cited

U.S. PATENT DOCUMENTS 2,191,802  2/1940  Novotny et al. .
2,364,900  12/1944  Hessel et al. ........................ 525/515
2,634,249  4/1953  Vogelsang .
3,627,471  12/1971  Bottom et al. .
3,753,934  8/1973  Diethelm et al. .................. 260/17.3

FOREIGN PATENT DOCUMENTS 1158705  12/1963  Fed. Rep. of Germany .
2144543  3/1973  Fed. Rep. of Germany .
3030248  3/1982  Fed. Rep. of Germany .
3430248  2/1986  Fed. Rep. of Germany .
60-18551  1/1985  Japan .
1198710  7/1970  United Kingdom .

Primary Examiner—Lewis T. Jacobs
Attorney, Agent, or Firm—Keil & Weinkauf

[57] ABSTRACT

Webs composed of inorganic or organic fiber material are bonded with a cured resin mixture consisting essentially of (A) from 5 to 80% by weight of a water-soluble condensation product of carbonyl number 0–200 which has been prepared by alkaline condensation from 0.1 to 0.4 mole of an aliphatic or cycloaliphatic condensable ketone and 1 mole of formaldehyde, and (B) from 20 to 95% by weight of a water-soluble amino and/or phenolic resin.

7 Claims, No Drawings

MINERAL AND TEXTILE WEBS BONDED WITH A CURED RESIN MIXTURE

The present invention relates to webs composed of inorganic or organic fiber material bonded with a cured resin mixture consisting essentially of (A) from 5 to 80% by weight of a water-soluble condensation product of carbonyl number 0–200 which has been prepared by alkaline condensation from 0.1 to 0.4 mole of an aliphatic or cycloaliphatic condensable ketone and 1 mole of formaldehyde, and (B) from 20 to 95% by weight of a water-soluble amino and/or phenolic resin.

The present invention also relates to webs incorporating specific binders as claimed in the subclaims and to a process for producing same.

Web binders based on unetherified or etherified amino resins, for example urea/formaldehyde resins or melamine/formaldehyde resins, have been known for a long time.

If they comprise urea/formaldehyde resins or specifically hydrophilized melamine resins as described in German Laid-Open Application DOS 3,430,248, German Patent 1,595,368 and German Published Applications DAS 1,158,705, DAS 1,210,174, DAS 1,210,173 and DAS 2,144,534, the webs coated with these reins have relatively high boil wash losses.

Web binders based on substantially unetherified melamine resins only have a limited shelf life. With some of the binders used the free formaldehyde content is undesirably high. Other binders of this type similarly eliminate on curing undesirably high proportions of the built-in formaldehyde.

It is an object of the present invention to provide mineral and textile webs which have been bonded with a cured resin mixture, which do not have the abovementioned disadvantages and in the production of which very little formaldehyde is evolved.

We have found that this object is achieved with the webs defined at the beginning.

Ketone-formaldehyde condensation products are known and described for example in Houben-Weyl, Methoden der organischen Chemie, volume XIV/2, 1963, p. 416 ff. Depending on the molar ketone-formaldehyde ratio, the products are high molecular weight or high-methylol or cyclic acetals or ethers.

Suitable for preparing component (A) are the low members of the homologous series of the dialkyl ketones, such as acetone, methyl ethyl ketone, diacetone alcohol and cyclohexanone. The use of higher molecular weight ketones is limited by the desire for the corresponding condensation products to be soluble in water. Particular preference is given to using acetone.

The ketone:formaldehyde molar ratio preferably corresponds to the reciprocal number of acidic H atoms available in the ketones.

In the case of acetone, which has the highest possible number of reactive CH bonds (6), a molar ketone:formaldehyde ratio from 1:3.75 to 1:7.0, preferably from 1:4.0 to 1:6.0, is recommended. For ketones having 5 reactive CH bonds the following ratios are applicable: from 1.3.0 to 1:6.0, preferably from 1:3.5 to 1:5.0. If ketone and formaldehyde are used in the stated ratios, virtually all the formaldehyde is converted, so that the aqueous reaction solution contains less than 1.5% by weight of free formaldehyde, even as a rule less than 0.2% by weight.

The alkaline condensation of the ketone with formaldehyde is preferably carried out in aqueous solution, possibly in the presence of $C_1$–$C_4$-alcohols, at from 20° to 70° C., preferably at from 30° to 60° C., lower temperatures being preferred particularly toward the end of the reaction, ie. at low free formaldehyde contents. Preferably, the condensation is carried out at a pH from 8 to 12, in particular at pH 10–11.5.

To maximize the conversion of keto groups on the ketone resin, a high conversion being indicated by the low carbonyl number (mg of KOH/g of solid as determined by the Heidbrink flat weighing bottle method of German Standard Specification DIN 53,189) from 0 to 200, preferably from 40 to 180, the condensation requires from 5 to 15% by weight of base, preferably from 6 to 12% by weight thereof, based on condensate. The base can be removed in the form of insoluble salts thereof, the base used in a conventional manner being preferably calcium hydroxide, which is separated off in the form of its formates, oxalates, phosphates or sulfates. Other suitable bases are for example sodium hydroxide, potassium hydroxide, sodium carbonate, potassium carbonate and barium hydroxide.

Condensation products (A) are colorless or slightly colored viscous substances. The ash content after removal of the insoluble salt is in general found to be from 0.1 to 0.3% by weight. The solids contents of the products can be raised to about 98% by weight. The solids content was determined in accordance with modified German Standard Specifications DIN 53,216 and DIN 53,189 (see page 7).

The crosslinking agents used for the ketone/formaldehyde condensation products are the conventional water-soluble amino and/or phenolic resins and precondensates thereof. These resins can be present in the form of their condensation products with $C_1$–$C_{10}$-aldehydes, preferably aliphatic $C_1$–$C_5$-monoaldehydes and -dialdehydes such as formaldehyde, glyoxal and glutardialdehyde, unetherified, partially etherified or completely etherified with, for example, aliphatic alcohols of 1 to 4 carbon atoms, such as methanol, ethanol, n-propanol, n-butanol, methylglycol or mixtures thereof. Suitable resins are described in German Laid-Open Application DOS 3,430,248, German Patent 1,595,368 and German Published Application DAS 1,158,705, DAS 1,210,174, DAS 1,210,173 and DAS 2,144,543.

Preference is given to using urea derivatives, for example the cyclic condensation products of urea with glyoxal (4,5-dihydroxyimidazolidin-2-one) or of urea with formaldehyde and/or isobutyraldehyde (4-hydroxy-5,5-dimethylhexahydropyrimid-2-one) and also acetylenediurea, in particular the etherified and unetherified methylolation products.

Particular preference is given to using 4,5-dihydroxyimidazolidin-2-one and/or condensation products thereof with formaldehyde, glyoxal or glutardialdehyde or with two or more of the aldehydes mentioned. For example, 1 mole of 4,5-dihydroxyimidazolidin-2-one may be reacted with two moles of formaldehyde to prepare 1,3-dimethylol-4,5-dihydroxyimidazolidin-2-one which may be condensed with from 0.5 to 2 moles of glyoxal.

The molar urea:aldehyde ratio used ranges in general from 0.1:1 to 10:1, preferably from 0.5:1 to 2:1, based on unsubstituted urea.

It is also possible for alcohols, for example methanol, ethanol, n-propanol, n-butanol, methylglycol or mixtures thereof, to be present in the condensation reaction, in which case partially or completely etherified condensation products are formed.

Condensation products based on cyclic ureas and glyoxal are described for example in U.S. Pat. Nos. 4,285,690 and 4,343,655.

To prepare the binders used according to the invention, from 5 to 80% by weight of component (A) are mixed with from 20 to 95% by weight of component (B). The preferred range for the mixing ratio of (A):(B) can differ with the nature of component (B). For water-soluble melamine resins based on methanol-etherified products and 1,3-dimethylol-3,4-dihydroxyimidazolidin-2-one preference is given to a ratio of from 50 to 70% by weight of component (A):from 30 to 50% by weight of component (B). If urea/formaldehyde condensation products are used as component (B), the preferred mixing ratio is from 10 to 60% by weight of component (A):from 40 to 90% by weight of component (B). In general, precondensation of the binder according to the invention from (A) and (B) is not necessary. If desired, in particular in the event of compatibility problems between the components or to effect partial etherification of the crosslinking agent, such a precondensation may be carried out at from 40° to 70° C. in the presence or absence of from 0.1 to 1.0% by weight of an organic or inorganic acid, such as p-toluenesulfonic acid.

Examples of combinations of ketone-formaldehyde condensation products with phenol-formaldehyde condensation products are described in U.S. Pat. Nos. 2,191,802 and 2,634,249.

Examples of the combination of ketone-formaldehyde resins with melamine resins are described in JP Laid-Open Applications 85/18,551. The products are prepared and processed in organic solvents.

The binders are treated with from 0.1 to 6% by weight, preferably from 1 to 3% by weight, of a thermal curing catalyst and are diluted with water to from 10 to 25% by weight strength.

Suitable catalysts are acids, or latent acids, and metal salts. Preference is given to p-toluenesulfonic acid, ammonium chloride, ammonium hydrogenphosphate and the nitrates, chlorides and acetates of magnesium and calcium. The coated webs are cured under conventional conditions, for example at from 120° to 250° C. in from 1 to 30 minutes.

The mineral or textile fiber webs can consist of natural or synthetic organic fibers, for example polyamides, polyethylene terephthalate, polypropylene, cellulose and/or viscose, and also mineral fibers, for example rockwool or preferably glass fibers, the fibers being of customary length and thickness. In the consolidation of the webs the aqueous resin solutions are generally used in a concentration from 10 to 25% by weight and applied by impregnating the webs by passing the webs for example through a bath of the impregnating resin and then squeezing off the impregnated web in a conventional manner. The webs can also be sprayed with the resin solutions or be treated with foamed resin solutions. After drying, the impregnated webs are then conventionally heat-treated at from 120° to 250° C. to cure the resins.

Binders suitable according to the invention are water-soluble and stable in aqueous solution, have low free and thermally detachable formaldehyde contents, and in the cured state adhere firmly to the coated webs.

The webs coated with the binder according to the invention have good mechanical properties, such as high breaking strength, high elongation and high water resistance, as revealed by the excellent values for the boil wash loss in the Table.

EXAMPLES

Preparation of resin components A

A/I Acetone-formaldehyde condensation product having a molar acetone:formaldehyde ratio of 1:5

31.75 g of calcium oxide were added at 40° C. to 131.25 g of acetone, 848.31 g of formalin (40% by weight strength aqueous solution), 961.0 g of water and 131.25 g of butanol and thoroughly stirred in. Once a free formaldehyde content of 0.28% by weight had been reached the reaction mixture was brought with formic acid to a pH of 6.5, and water was distilled off under reduced pressure at a temperature not higher than 70° C. The residue was diluted with 817 g of methanol and filtered through a suction filter. Methanol was removed under reduced pressure at 70° C. and the residue was diluted with 130 g of water.

500 g were obtained of a slightly yellowish product whose solids content as measured by German Standard Specification DIN 53,216 (2 g sample kept at 125° C. for 2 hours) was found to be 70% by weight, the water content being 24.8% by weight. The solids content as measured by the Heidrink(*) flat weighing bottle method was 74.1% by weight, the ash content was 0.11% by weight, the free formaldehyde content was 0.55% by weight and the carbonyl number was 105.0 mg of KOH/g of Heidbrink solids.

The quantities of formaldehyde emitted in the course of curing as measured by the method described in Melliand Textilber, 54 (1973), 415–418, 529–532 and 669–675 can be reduced down to values of 0.1% by weight, based on the solid resin content.

A/II Acetone-formaldehyde condensation product having a molar acetone:formaldehyde ratio of 1:4

33 g of calcium oxide were added at 40° C. to 132.0 g of acetone, 1203 g of formalin (40% strength by weight aqueous solution) and 180 g of methanol and thoroughly stirred in. Once a free formaldehyde content of 0.9% by weight had been reached the reaction mixture was acidified with formic acid to pH 6.45 and worked up in the same way as product A/I using 1400 g of methanol. The yield was 612.0 g.

The solids content of the slightly colored product was 80.0% by weight, the Heidbrink(*) solids content was 93.5% by weight, the ash content was 0.45% by weight, the free formaldehyde content was 0.85% by weight and the carbonyl number was 184 mg of KOH/g of Heidbrink(*) solids.

EXAMPLE 1

A needled polyester spunbonded web of about 190 g/m² was impregnated with an approximately 12% strength by weight aqueous binder liquor, and the excess binder liquor was squeezed off. The squeeze pressure was adjusted in such a way that after the web had been dried at 170° C. the binder content was about 20% by weight, based on the weight of fiber. The impregnated and dried web had a weight of about 230 g/m².

The binder liquor comprised
60 g (as solid) of a resin as per method A/I
40 g (as solid) of a melamine resin having about 3 methanoletherified (*) as defined in German Standard Specification DIN 53,189, 0.2 g sample of 70% strength by weight aqueous solution, the test bottle being dried over $P_2O_5$ at room temperature in a water pump vacuum for 2 hours with and without substance) N-methylol groups 1 g (as solid) of ammonium chloride

EXAMPLE 2

Using the method of Example 1 a needled polyester web was bonded with binder liquor comprising 60 g (as solid) of a resin as per method A/II 40 g (as solid) of a melamine resin having about 3 methanolesterified N-methylol groups 1 g (as solid) of ammonium chloride.

EXAMPLE 3

The method of Example 1 was followed to bond a needled polyester spinbonded web with the following binder liquor:

70 g (as solid) of a resin as per method A/I 30 g (as solid) of 1,3-dimethylol-4,5-dihydroxyimidazolidin-2-one 1 g (as solid) of ammonium chloride.

EXAMPLE 4

A glass web having a weight of about 25 g/m² was impregnated with a 15% strength by weight aqueous binder liquor. With the aid of a circulating polyester fabric the glass web was guided over a suction slot which removed excess binder liquor. The suction force was set in such a way that, after drying at 180° C., the glass web contained about 20% by weight of binder (as solid), based on the weight of glass.

The binder liquor comprised:

50 g (as solid) of resin as per method A/I 50 g (as solid) of 1,3-dimethylol-4,5-dihydroxyimidazolidin-2-one 1 g (as solid) of ammonium chloride.

The Table shows the breaking strengths and elongations of the webs of Examples 1 to 4.

TABLE

| | Breaking strength [N/5 cm of width] | Elongation [%] | Washoff Loss [%] |
|---|---|---|---|
| Web of Example 1 | 613 | 61 | — |
| Web of Example 2 | 674 | 64 | — |
| Web of Example 3 | 703 | 66 | — |
| Web of Example 4 | 108.5 | — | 1.4 |

We claim:

1. A web composed of inorganic or organic fiber material bonded with a cured resin mixture consisting essentially of
   (A) from 5 to 80% by weight of a water-soluble condensation product of carbonyl number 0-200 which has been prepared by alkaline condensation, with calcium hydroxide as the condensing agent, of from 0.1 to 0.4 mole of an aliphatic or cycloaliphatic condensable ketone for each 1 mole of formaldehyde, with additional separation of the condensing agent in the form of its insoluble salts, and
   (B) from 20 to 95% by weight of a water-soluble amino and/or phenolic resin.

2. A web as claimed in claim 1 obtainable with a binder component (A) of carbonyl number 40-180.

3. A web as claimed in claim 1 obtainable with a binder component (A) where the molar ratio of ketone: formaldehyde ranges from 0.2 to 0.25.

4. A web as claimed in claim 1 obtainable from a water-soluble urea resin as component (B).

5. A web as claimed in claim 1 obtainable with a binder component B comprising 4,5-dihydroxyimidazolidin-2-one and/or an unetherified, partially etherified or completely etherified condensation product thereof with formaldehyde, glyoxal and/or glutardialdehyde.

6. A web as claimed in claim 1 obtainable with 1,3-dimethylol-4,5-dihydroxyimidazolidin-2-one as component (B).

7. A web as claimed in claim 1, obtainable from a water-soluble melamine resin as component (B).

* * * * *